United States Patent [19]

Bhatt et al.

[11] Patent Number: 4,580,872
[45] Date of Patent: Apr. 8, 1986

[54] COLLISION DETECTION APPARATUS UTILIZING TAP MEANS CONNECTED TO EACH TRANSMITTING OPTICAL FIBER FOR FIBER OPTIC LOCAL AREA NETWORKS

[75] Inventors: Vipul J. Bhatt; J. Richard Jones; Richard P. Kelley, all of Raleigh, N.C.

[73] Assignee: FiberLAN, Inc., Ga.

[21] Appl. No.: 523,852

[22] Filed: Aug. 17, 1983

[51] Int. Cl.$^4$ ................................................ G02B 6/28
[52] U.S. Cl. .................. 350/96.16; 455/612; 250/227
[58] Field of Search ................ 455/610, 612; 250/227; 350/96.15, 96.16

[56] References Cited

U.S. PATENT DOCUMENTS

| | | | |
|---|---|---|---|
| 4,233,589 | 11/1980 | Rawson et al. | 340/147 R |
| 4,369,524 | 1/1983 | Rawson et al. | 455/606 |
| 4,422,179 | 12/1983 | Albanese | 455/601 |
| 4,491,942 | 1/1985 | Witte et al. | 370/4 |

Primary Examiner—John Lee
Assistant Examiner—Lester Rushin, III
Attorney, Agent, or Firm—Roy B. Moffitt

[57] ABSTRACT

A fiber optic Local Area Network containing more than one transmitter-receiver combination capable of transmitting and receiving light energy over optical fibers and being deactivatable during transmission upon receiving a jam signal, a coupler means, a collision detection means for detecting when more than one transmitter is transmitting at the same time, and a plurality of optical fibers connecting the coupler means to said transmitter-receiver combinations and forming transmitting and receiving light paths there between, the collision-detection means comprising a tap means connected to each transmitting optical fiber for diverting a portion of the transmitted light energy; an optical receiver means for each optical fiber containing a tap adapted to detect that portion of an optical signal diverted by said tap means; an optical path between each tap means and a single optical receiver means; a logic means connected to said optical receiver means responsive to and adapted to transmit a predetermined signal when two or more simultaneously co-existing optical signals are detected in two or more optical receiver means; a jam signal means adapted to be activated by the predetermined signal emitted by the logic means and to transmit a jam signal to each transmitter-receiver combination, and a means in the transmitter-receiver combination to detect and is responsive to the jam signal.

8 Claims, 2 Drawing Figures

COLLISION DETECTION APPARATUS UTILIZING TAP MEANS CONNECTED TO EACH TRANSMITTING OPTICAL FIBER FOR FIBER OPTIC LOCAL AREA NETWORKS

BACKGROUND OF THE INVENTION

A typical Carrier Sense Multiple Access/Collision Detection (CSMA/CD) type fiber optic Local Area Network comprises a plurality of computers or stations connected together so that one station can communicate with another through a common bus. Specifically such networks are a configuration made up of a plurality of stations, each station being a combination transmitter and receiver and connected via transmitting and receiving optical fibers to a common bus, for example, a star coupler. At any given time, only one station can have access to the single channel of the system. Transmission by one station is a transmission to all stations through the star coupler. A problem faced by the prior art in this kind of a network arises out of the situation where more than one station is simultaneously transmitting, i.e., a "collision." When a collision takes place, it must be detected and dealt with, otherwise data packets will be lost, i.e., damaged beyond recognition. Current practice is to locate a collision detection means within the transmitter-receiver (transceiver) units. Signals that reach such collision detection means during a collision are not a single signal, but a mixture of two or more signals. Present day collision detection circuits rely on the assumption that this mixture of colliding signals has caused a detectible amount of distortion or abnormal signal and such can be detected because it is different from a normal signal.

In the context of Local Area Networks (LAN's) using fiber optic cable, this assumption is not always justified; for example, where one station is physically located nearer to the star coupler than another. Compare station 11 vs. station 12 or 4 of FIG. 1. The amplitude of a light signal diminishes as it travels through an optical fiber; thus, during a collision the signal from the station closest to the star coupler will be broadcasted to all other stations with a much stronger amplitude than the signal from a station further away. In such a situation, it is likely that the broadcasted mixed signals will look very much like the signal from the station closest to the star coupler. Stated in another way, the signal from the most remote station will be so weak compared to the signal from the closest station, their collision will fail to produce a detectible amount of distortion. A collision detection circuit based in the transceiver in the remote station will fail to detect the collision and this problem is known in the trade as the "dynamic range problem."

BRIEF DESCRIPTION OF THE INVENTION

In a fiber optic implementation of a CSMA/CD type LAN, more particularly a CSMA/CD network, a signal from a signal transmitted over a transmitting fiber upon reaching the star coupler is divided equally and broadcasted to all other stations in the network. In such a network, no two signals can collide with one another until after both of them reach the star coupler. This invention takes advantage of the fact.

Optical taps are placed in optical transmitting fibers near or remote to the star coupler. A tap is a passive fiber optic device that allows the light being transmitted thereby to be split into two parts. One part is transmitted to the star coupler while the other part is branched off to the collision detection circuit, physically located very near the star coupler. Each transmitting fiber (not the fibers used to receive signals) is individually tapped. The amount of light the tap diverts is only a small fraction (10% for example) of the originally transmitted light, allowing most of the optical power to go through to the star coupler.

The collision detection device of this invention includes an individual optical receiver for each tap and is connected to each tap by an optical fiber. The receiver's function is to detect the presence of an optical signal, such as a 10 Mbits/sec. signal, convert the optical signal into an electrical signal, and then convert the 10 Mbits/sec. signal to a signal for processing by the collision detection circuits, i.e., a D.C. voltage. Regardless of the strength of the received optical signal by the optical receiver, each receiver amplifies the signal to a predetermined standard amplitude, so long as the strength of the signal is within a certain range determined by the limitations of the system and its components. After amplification, the A.C. signal is rectified and filtered and is transmitted to a logic circuit. For example, the signal could be filtered and rectified to produce a D.C. signal which is used to trip a comparator with the comparator's output being used to trigger logic circuits that are responsive thereto. The taps are placed in the collision detection system just before the star coupler; consequently, if any optical receiver receives a signal it will receive it singly, i.e., in an uncollided form. The outputs of each optical receiver are in electrical communication with a logic circuit, which continuously monitors the output of the receivers and are adapted to detect the simultaneous presence at any time of more than one signal.

Within the collision detection system is a jam signal means connected to the logic means and the star coupler and such means is activably responsive to a predetermined signal transmitted by the logic means, i.e., when it detects the presence of two or more co-existing optical signals in two or more optical receiver means. The jam signal (one mega hertz) is selected so as to be easily distinguished from the normally transmitted signal (10 mega hertz). When a jam signal reaches a transmitter-receiver combination, there are several things that may be done with it, for example, but not by way of limitation, (a) it may activate a portion of the transmitter-receiver circuit that will cause transmission to cease entirely for a predetermined length of time; or (b) it may activate a circuit whereby the station will transmit an arbitrary sequence of one's [1] and zero's [0] for a predetermined length of time instead of continuing to transmit the balance of the data package previously sought to be transmitted; or (c) it may be used to activate a circuit that will record the collision and data pertinent to that collision as compared to other prior collisions, e.g., length of collision, time between collisions and number of collisions per unit time; or, any combination of (a), (b) and (c).

DETAILED DESCRIPTION OF THE INVENTION

Figure 1:
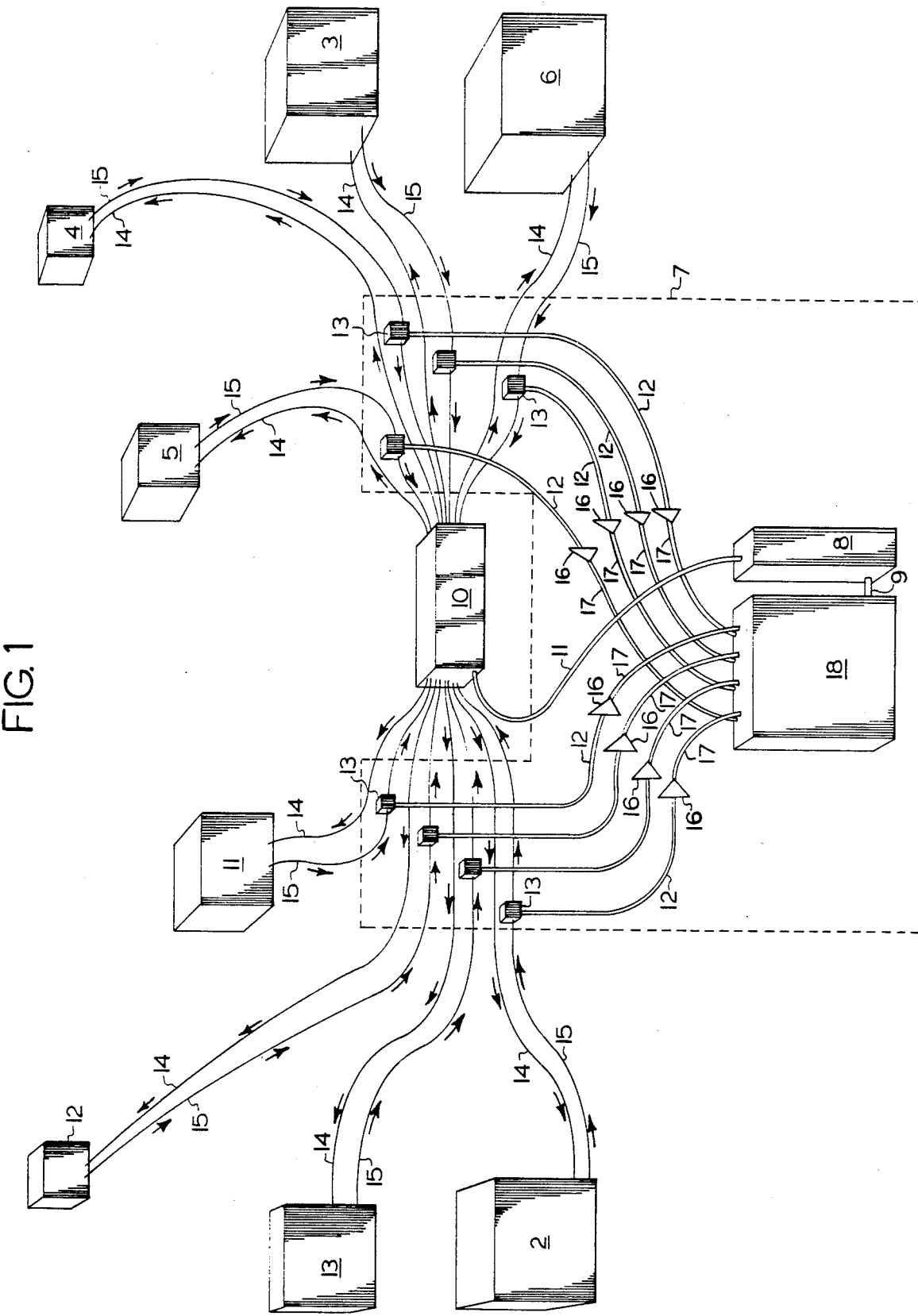
FIG. 1 is a schematic representation of a Local Area Network having a collision detection system.
Figure 2:
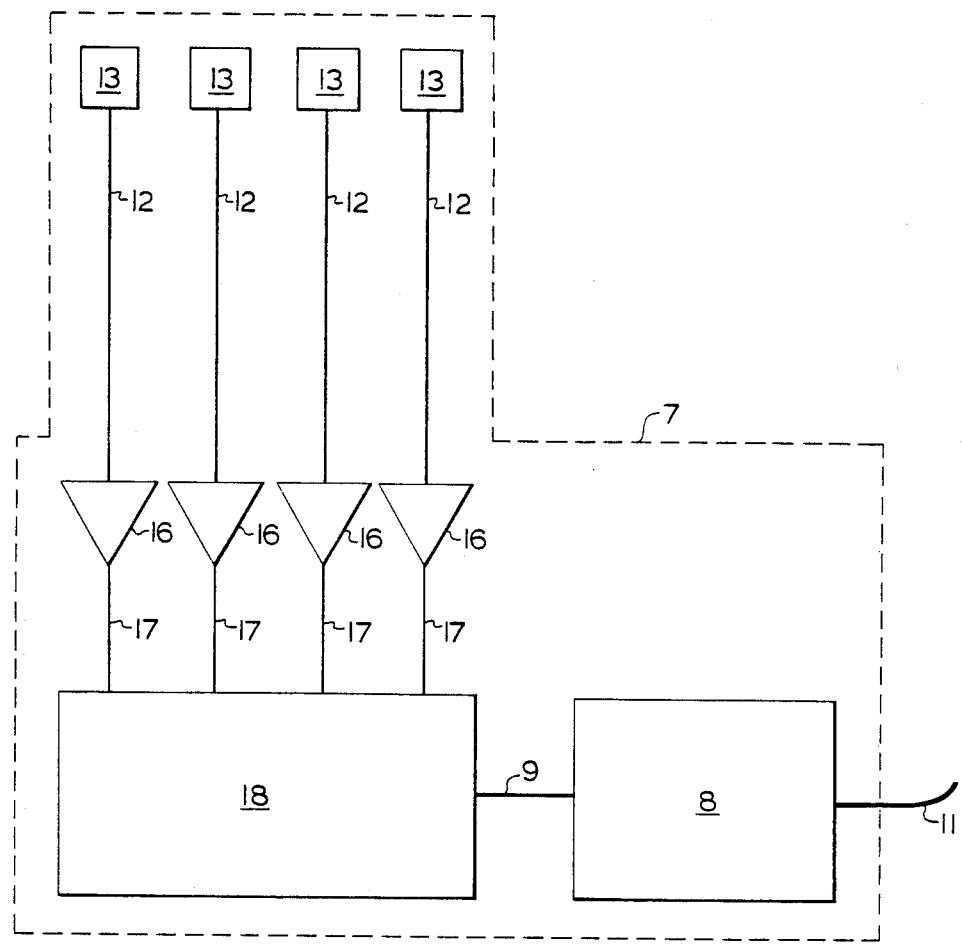
FIG. 2 is a schematic representation of the collision detection device of FIG. 1.

Shown by element 1 of FIG. 1 is a Carrier Sense Multiple Access/Collision Detection type fiber optic Local Area Network comprising a plurality of computers or stations 2, 3, 4, 5, 6, 11, 12 and 13 connected together by optical fibers 14 and 15 to coupler 10 so that one station can communicate with all others herein. Coupler 10 is generally known in the trade as star coupler, an example of which is TSC 8×8—100 transmissive star connectorized optical coupler manufactured by the Canstar Communications Division of Canada Wire & Cable, Ltd. of Ontario, Canada. Fibers 15 are fibers used to transmit signals and fibers 14 are ones that are used to receive signals from the star coupler.

At any given time, only one station can have access to the transmission channel formed by optical fibers 14 and 15 and star coupler 10. Transmission by one station is broadcasted to all stations through the star coupler. When more than one station is transmitting simultaneously a collision occurs between the signals. It will be noted that the collision detection system embodiment of the Local Area Network shown by FIG. 1—comprised of taps 13, optical fibers 12, logic means 18, optical fiber 9, jam signal means 8 and optical fiber 11—is located in the vicinity of the optical coupler 10 for ease of implementation. However, the collision detection means may be located some distance away from the star coupler, and still manage to function adequately, especially when a strong jam signal is used, i.e., stronger than transmit signal. So long as the stations receive a jam signal stronger than any other signal, the system operates well.

When a collision takes place, it must be detected by a collision detection system 7 and dealt with. Current practice is to base the collision detection system within the stations; however, in such situations, the "signal" that reaches a station after a collision is not a single signal but a mixture of two or more signals. The collision detection system in these stations rely upon the assumption that this mixture has caused a detectible amount of distortion and such distortion is easy to recognize as being different from the normal signal, this such assumption is not always justified, especially in the case where stations are closely located to the coupler such as 2, 11 and 13 compared to stations 3, 4, 5, 6, 7 and 12. Since the amplitude of a signal diminishes as it travels through fibers 14 and 15, the signal from station 11 will be broadcasted to all other stations with a much stronger amplitude than the signal say from station 4 or 12. In the event that signals from stations 11, 4 and 12, for example, are involved in the collision, it is more than likely that the broadcasted mixed signal will look very much like the signal from station 11. Stated alternatively, the signal from station 4 or 12, will be so weak compared to that from station 11, that it will fail to produce a detectible amount of distortion in the signal of station 11. This is the "dynamic range problem."

Network 1 of FIG. 1 solves this problem. A signal of any station upon reaching the star coupler is divided equally and broadcasted to all stations in the network. No signal can collide with any other signal until after it has reached the star coupler. Incoming fiber cables (fibers 14 and 15) are connected to the star coupler and the various stations, forming a transmission and receiving path. Taps 13 are inserted in the transmit fibers 15, i.e., the fibers used by the stations in question to transmit signals, and are passive fiber optic devices that allow the transmitting signal in the form of light to be split into two outputs. One of these outputs is connected to star coupler 10 as shown while another output is branched off to the collision detection means 7 via tap 13 and fiber optic 12. Collision detection device 7 may or may not be physically located very near to the star coupler 10. The amount of light drawn away from or tapped from the original signal is only a small fraction (10% for example), allowing most of the optical power to go through into the optical coupler and onto other stations.

Part (10% or less) of the light transmitted by any given station is diverted through tap 13 into optical fiber 12 and then into the logic means 18 in the form of a voltage. Collision detection means 7 is composed of a plurality of tap means 13, optical receivers 16—one optical receiver of each tap, and each receiver is connected to a single tap by optical fibers 12—logic means 18 and jam signal means 8. The signal received by anyone of receivers 16 may be weak or strong, depending on the physical distance of the corresponding network station from the star coupler, and their function is to detect the presence of an optical signal (such as an optical signal), convert the optical signal to an electrical signal, and then convert the electrical signal for process, etc., as previously described, to achieve an output voltage. The output voltages are then transmitted by lead wire 17 to logic means 18, programmed to be responsive to and detect the simultaneous presence of a signal in one or more leads 17, i.e., responsive when one or more stations are transmitting at the same time (a collision is in process). Upon detecting two or more signals on leads 17, logic means 18 is responsive thereto and thereby sends out a predetermined signal along lead 9 to jam signal means 8. Jam signal means 8 is responsive to the predetermined signal emitted by logic means 18 and in response to such signal it transmits over lead 11 a jam signal to all stations. Within each station, there is a means (not shown) that is responsive to the jam signal emitted by jam signal means 8, and when activated will perform one or more of the peviously identified functions.

One of the primary benefits of the above-disclosed collision detection system is that it completely bypasses and solves the dynamic range problem. Even when a very strong signal is colliding with a weak signal, such a collision can be successfully detected because each signal accessing the channel of the LAN is individually detected by means of tap 13 and optical fiber 12, one for each transmitting fiber. The determination of a collision by logic means 18 is based on the number of signals present in a channel at any time, not their respective amplitudes. Stated in another way, the logic means is programmed to detect a simultaneous presence of two or more signals in fiber optic leads 17 and when such is done a predetermined signal is emitted by logic means 18 through lead 9 to jam signal means 8 which emits a jam signal through lead 11 through coupler 10 and receiving fibers 14 and thus to all of the various stations.

An additional advantage of the disclosed collision detection system is that it is completely independent of some network specific features. For example, the detection of a collision in networks where a different bit rate is used or a different signaling code is employed.

Jam signal means 8, when activated, turns on a light emitting diode, which gives out optical power and sends that optical power over lead 11 through coupler 10 and receiving fibers 14 to all stations. This signal is not necessarily constrained by any particular form; it can be selected for best performance and can be most anything that meets the condition of the system. Optical fiber 11, attached to the jam signal means, is exclusively connected to one of the input ports of the star coupler (untapped) and as light from it passes through the star coupler, the jam signal is divided and distributed to all stations on the network. All of the stations, as previously stated, are equipped with a simple circuit adapted to recognize a jam signal and upon recognition of it to be responsive thereto to perform anyone or all of the previously stated functions.

By locating the collision detection system closer to the star coupler 10 than any of the stations 2, 3, 4, 5, 6, 7, 12 and 13, such insures that all of such stations will receive the jam signal at a power level higher than any other signal. All other signals originating from a given station would have to travel a longer distance, i.e., the distance from the station to the star coupler then from the star coupler to all other stations, in comparison to the jam signal emitted by element 8. Consequently, the jam signal is the strongest signal received by any station thereby insuring its successful detection and its recognizability as a jam signal and not as a data signal. It also has characteristics different from the signal emitted by the various stations, thus making it easy for the stations to detect it distinctly. An alternative embodiment is one that includes a jam signal that has different characteristics than the signal emitted by the various stations, thus making it even easier for the stations to detect it distinctly. For example, a jam signal that arises out of a higher power optical source (higher in power than any other optical source in the system) may be used, especially for those situations where the collision detection unit is not located close to the star coupler.

What is claimed is:

1. A fiber optic Local Area Network containing more than one transmitter-receiver combination capable of transmitting and receiving light energy, a coupler means, a collision detection means for detecting when more than one transmitter is transmitting at the same time, and a plurality of optical fibers for transmitting and receiving optical signals, said optical fibers connecting the coupler means to said transmitter-receiver combinations forming a light path there between, said collision detection means comprising:
    (a) tap means connected to each transmitting optical fiber for diverting a portion of the light energy transmitted by said optical fibers;
    (b) an optical receiver means for each tap means, adapted to detect that portion of an optical signal diverted by said tap means;
    (c) an optical path between each tap means and each optical receiver means; and,
    (d) a logic means electrically connected to each of said optical receiver means adapted to detect when two or more co-existing optical signals are received by two or more optical receiver means and is responsive to said detection to transmit a predetermined signal.

2. The network of claim 1 wherein said coupler means is a star type coupler.

3. The network of claim 1 including a jam signal means connected to said logic means and said coupler and responsive to said predetermined signal of said logic means to emit a jam signal to said transmitter-receiver combinations.

4. The network of claim 3 wherein each transmitter-receiver combination contains a logic means connected thereto and said jam signal means and is responsive to said jam signal.

5. The network of claim 1 wherein said optical receiver means contains means to convert light energy with an electrical signal.

6. The network of claim 5 wherein said optical receiver means contains means to amplify said electrical signal to a predetermined level.

7. The network of claim 6 wherein said logic means is responsive to the simultaneous detection of the electrical signal from two or more optical receivers.

8. The network of claim 1 wherein said collision detection means is located closer to said coupler means than any of said transmitter-receiver means.

* * * * *